(12) United States Patent
Wu (10) Patent No.: US 8,244,205 B2
(45) Date of Patent: Aug. 14, 2012

(54) REESTABLISHMENT OF AN RRC CONNECTION FOR AN EMERGENCY CALL IN AN LTE NETWORK

(75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/214,993

(22) Filed: Aug. 22, 2011

(65) Prior Publication Data
US 2011/0306316 A1   Dec. 15, 2011

Related U.S. Application Data

(63) Continuation of application No. 12/940,988, filed on Nov. 5, 2010, now abandoned.

(60) Provisional application No. 61/258,214, filed on Nov. 5, 2009.

(51) Int. Cl.
*H04M 11/04* (2006.01)
(52) U.S. Cl. .................. 455/404.1; 455/434; 455/435.1; 455/435.2; 455/436; 370/328; 370/331; 370/332
(58) Field of Classification Search ............... 455/127.4, 455/404.1, 404.2, 422.1, 432.1, 435.1, 436, 455/443, 444, 448, 452.2, 453, 456.1, 458, 455/521, 524, 525, 552.1; 370/310, 328, 370/331, 332, 333
See application file for complete search history.

(56) References Cited

U.S. PATENT DOCUMENTS

| 6,799,038 B2 | 9/2004 | Gopikanth |
| 7,333,795 B2 | 2/2008 | Dorsey et al. |
| 7,570,947 B2 | 8/2009 | Roberts |
| 2003/0207702 A1 | 11/2003 | Chen |
| 2008/0102784 A1 | 5/2008 | Mittal et al. |
| 2008/0153454 A1 | 6/2008 | Haapapuro et al. |
| 2008/0153486 A1 | 6/2008 | Ramkull et al. |

(Continued)

FOREIGN PATENT DOCUMENTS

| EP | 2117263 | 11/2009 |
| WO | WO-2010024111 | 3/2010 |
| WO | WO-2010063316 A1 | 6/2010 |
| WO | WO-2010093299 A1 | 8/2010 |
| WO | WO-2010110709 A1 | 9/2010 |
| WO | WO-2010110711 A1 | 9/2010 |

OTHER PUBLICATIONS

Al-Rawi et al., "Channel-Aware Inter-Cell Interference Coordination for the Uplink of 3G LTE Networks," Wireless Telecommunications Symposium, 2009, WTS 2009, Jun. 5, 2009, p. 1-5.

(Continued)

*Primary Examiner* — Anthony Addy
(74) *Attorney, Agent, or Firm* — Perkins Coie LLP (57) ABSTRACT

A mobile device initiates an RRC connection reestablishment procedure or a cell update procedure for an emergency call after experiencing a failure condition in an LTE network environment. The mobile device establishes an RRC connection with an acceptable cell to originate an emergency call. The mobile device detects a failure condition, such as a radio link failure, which disrupts the RRC connection. The mobile device searches for available cells that it may reestablish the RRC connection with, but can only find acceptable cells. The mobile device may initiate an RRC connection reestablishment procedure with an acceptable cell. The mobile device may also only attempt to reestablish the RRC connection with a cell that is part of a PLMN that the original acceptable cell was also a part of. The mobile device may also enter an RRC_IDLE mode upon detecting a failure condition.

8 Claims, 6 Drawing Sheets

U.S. PATENT DOCUMENTS

| | | | |
|---|---|---|---|
| 2008/0225785 | A1 | 9/2008 | Wang et al. |
| 2008/0261600 | A1 | 10/2008 | Somasundaram et al. |
| 2008/0268878 | A1 | 10/2008 | Wang et al. |
| 2009/0042582 | A1 | 2/2009 | Wang et al. |
| 2009/0061878 | A1 | 3/2009 | Fischer |
| 2009/0239554 | A1 | 9/2009 | Sammour et al. |
| 2009/0298459 | A1* | 12/2009 | Saini et al. ............ 455/404.1 |
| 2010/0041418 | A1 | 2/2010 | Edge et al. |
| 2010/0062768 | A1 | 3/2010 | Lindqvist et al. |
| 2010/0080116 | A1 | 4/2010 | Agashe et al. |
| 2010/0113010 | A1 | 5/2010 | Tenny et al. |
| 2010/0130205 | A1 | 5/2010 | Jung et al. |
| 2010/0156710 | A1 | 6/2010 | Wirola et al. |
| 2010/0216469 | A1 | 8/2010 | Yi et al. |
| 2010/0255807 | A1 | 10/2010 | Umatt et al. |

OTHER PUBLICATIONS

Sari et al., "Full Frequency Reuse in Mobile WiMAX and LTE Networks with Sectored Cells," Mobile WiMAX Symposium, 2009, MWS '09, IEEE, Oct. 2, 2009, p. 42-45.

Takizawa, et al., "Pinpointing the Place of Origin of a Cellular Phone Emergency Call Uing Active RFID Tags," 22nd International Conference on Advanced Information Networking and Applications—Workshops, 2008, AINAW 2008, 2008, p. 1123-1128.

Ntantogian et al., "One-Pass EAP-AKA Authentication in 3G-WLAN Integrated Networks," Wireless Personal Communications, v 48 N 4, Jul. 2008, p. 569-584.

3rd Generation Partnership Project, "3GPP TS 36.331 V9.0.0 (Sep. 2009)," Technical Specification Group Radio Access Network; Evolved Universal Terrestrial Radio Access (E-UTRA); Radio Resource Control (RRC); Protocol specification (Release 9).

3rd Generation Partnership Project; "3GPP TS 36.304 V9.0.0 (Sep. 2009)," Technical Specification Group Radio Access Network; Evolved Universal Terrestrial Radio Access (E-UTRA); User Equipment (UE) procedures in idle mode (Release 9).

3rd Generation Partnership Project; "3GPP TS 36.300 V9.1.0 (Sep. 2009)," Technical Specification Group Radio Access Network; Evolved Universal Terrestrial Radio Access (E-UTRA); and Evolved Universal Terrestrial Radio Access Network (E-UTRAN); Overall description; Stage 2 (Release 9).

3rd Generation Partnership Project; "3GPP TS 25.331 V9.0.0 (Sep. 2009)," Technical Specification Group Radio Access Network; Radio Resource Control (RRC); Protocol Specification (Release 9).

* cited by examiner

REESTABLISHMENT OF AN RRC CONNECTION FOR AN EMERGENCY CALL IN AN LTE NETWORK

CROSS-REFERENCE TO RELATED APPLICATION(S)

This application is a continuation of U.S. patent application Ser. No. 12/940,988 filed on Nov. 5, 2010 and titled REESTABLISHMENT OF AN RRC CONNECTION FOR AN EMERGENCY CALL IN AN LTE NETWORK, which claims the benefit of U.S. Provisional Application No. 61/258,214 filed on Nov. 5, 2009 and titled METHOD TO HANDLE RRC CONNECTION RECOVERY IN WIRELESS COMMUNICATIONS SYSTEM, each of which is incorporated herein by reference in its entirety.

BACKGROUND

In an emergency, a person's mobile device (i.e., user equipment (UE)) is often his or her lifeline for help. This dependence makes it crucial that the mobile device be able to establish emergency calls (e.g., to 9-1-1) whenever necessary. To this end, mobile devices are generally allowed to establish emergency calls through cells of wireless networks that they are not authorized to use for normal service.

In a Long Term Evolution (LTE) or Universal Mobile Telecommunications System (UMTS) radio network, a mobile device establishes a radio resource control (RRC) connection through a cell to use network services. The mobile device can camp on a suitable cell to obtain normal service. The mobile device can camp on an acceptable cell only to originate emergency calls (e.g., a circuit switched (CS) or an Internet Protocol Multimedia Subsystem (IMS) emergency call) and receive Earthquake and Tsunami Warning System (ETWS) and Commercial Mobile Alert System (CMAS) notifications. As a result, a mobile device establishes an emergency call through either a suitable cell or an acceptable cell.

Like any other call, emergency calls can be disrupted by failure conditions that interrupt the RRC connection. Failure conditions may include radio link failures, handover failures, mobility from evolved Universal Mobile Telecommunications System (UMTS) Terrestrial Radio Access (e-UTRA) failures, integrity check failures, RRC connection reconfiguration failures, or other failures. To continue the emergency call after a failure condition, the mobile device can perform an RRC connection reestablishment procedure in an LTE network or a cell update procedure in a UMTS network. Existing mobile devices operating in an LTE or UMTS network with an established emergency call via an RRC connection often struggle to reestablish the RRC connection once it experiences a failure condition.

DETAILED DESCRIPTION

Overview

The present disclosure is directed to reestablishing an RRC connection that was established for an emergency call in an LTE or a UMTS network environment. As discussed below, the mobile device initiates an RRC connection reestablishment procedure or a cell update procedure when it detects a failure condition, such as a radio link failure, a handover failure, etc. Although embodiments of the disclosure discuss the reestablishment of an RRC connection with respect to an RRC connection reestablishment procedure, it will be appreciated that in a UMTS network environment, a cell update procedure may be used.

In some implementations, the mobile device has an emergency call connected via an RRC connection established with an acceptable cell. The mobile device detects a failure condition and searches for available cells with which to reestablish the RRC connection. If a suitable cell is detected, the mobile device commences an RRC reestablishment procedure with the suitable cell. If no suitable cell is found, but the mobile device detects an acceptable cell, the mobile device initiates an RRC reestablishment procedure with a detected acceptable cell. In some implementations, the mobile device initiates an RRC connection reestablishment procedure with an acceptable cell regardless of whether it also finds a suitable cell.

In some implementations, the mobile device has an emergency call connected via an RRC connection established with an acceptable cell. The mobile device detects a failure condition and immediately enters an RRC_IDLE state. The mobile device does not initiate an RRC connection reestablishment procedure. Instead, the mobile device can originate another emergency call without having to wait for a timer (T311 in e-UTRAN or T305 in UTRAN) to expire while it searches for a suitable cell to connect with.

In some implementations, the mobile device has an emergency call connected via an RRC connection established with an acceptable cell. The mobile device detects a failure condition and searches for available cells with which it can commence an RRC connection reestablishment procedure. If the mobile device finds a cell that belongs to a public land mobile network (PLMN) that the original acceptable cell belongs to, the mobile device initiates an RRC connection reestablishment procedure with that cell. In some implementations, if the mobile device finds a suitable cell that does not belong to a PLMN that the original acceptable cell belongs to, the mobile device enters an RRC_IDLE mode and subsequently requests that a new RRC connection be established with the suitable cell.

In some implementations, the mobile device has an emergency call connected via an RRC connection established with a cell. The mobile device detects a failure condition and searches for a cell that supports emergency calls that the mobile device can reestablish the RRC connection with. If the mobile device finds such a cell, it initiates an RRC connection reestablishment procedure with that cell.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Description

The following discussion provides a brief, general description of a representative environment in which the invention can be implemented. Although not required, aspects of the invention may be described below in the general context of computer-executable instructions, such as routines executed by a general-purpose data processing device (e.g., a server computer, a personal computer, or a mobile/portable device). Those skilled in the relevant art will appreciate that the invention can be practiced with other communications, data processing, or computer system configurations, including wireless devices, Internet appliances, hand-held devices (including personal digital assistants (PDAs)), wearable computers, tablet computers, netbook computers, all manner of cellular or mobile phones, multi-processor systems, microprocessor-based or programmable consumer electronics, set-top boxes, network PCs, mini-computers, mainframe computers, and the like. Indeed, "mobile device" as used herein may refer to any of the above devices and systems.

While aspects of the invention, such as certain functions, are described as being performed exclusively on a single device, the invention can also be practiced in distributed environments where functions or modules are shared among disparate processing devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

Figure 1:
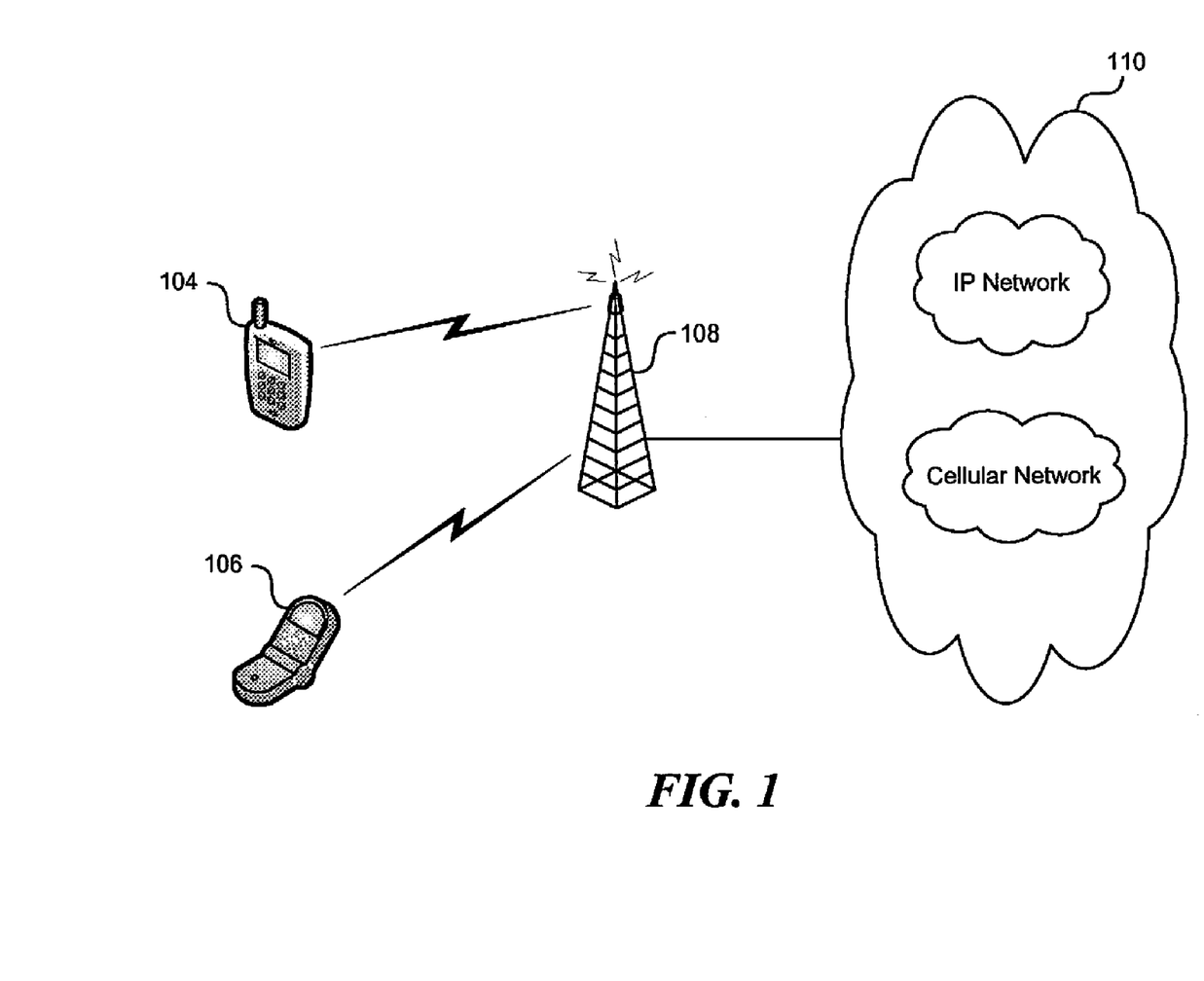
FIG. 1 is a system diagram illustrating a representative LTE network environment for implementing aspects of the invention.

As shown in the example of FIG. 1, mobile devices 104, 106, such as a cellular phone, may wirelessly communicate with one or more cells of a cell tower 108 coupled to a network 110. In some implementations, the network 110 is an LTE network. In other implementations, the network 110 is a UTRAN network. The term "mobile device," as used herein, may be a cell phone, a personal digital assistant (PDA), a portable email device (e.g., a Blackberry® device), a portable media player (e.g., an Apple iPod Touch®), a tablet or slate computer (e.g., an Apple iPad®), a netbook computer, a notebook computer, an e-reader, or any other device having wireless communication capability. The network 110 may be an IP-based telecommunications network, and communication between the cell tower 108 and the mobile devices 104, 106 may be based, for example, on e-UTRAN or UTRAN, utilizing, for example, orthogonal frequency-division multiple access (OFDMA) and single-carrier frequency-division multiple access (SC-FDMA).

As mentioned earlier, the network 110 communicates with the mobile devices 104, 106 via a cell of the cell tower 108. The cell tower may be a cellular transceiver or base station antenna. In some implementations, the cell is a femtocell or a hybrid of a macro cell and femtocell. In some implementations, a cell of the cell tower 108 is part of a single PLMN, while in other implementations, a cell of the cell tower 108 is part of multiple PLMNs.

Although the mobile devices 104, 106 are generally described in the examples provided below, aspects of the invention apply equally to any communication device, such as a laptop, or a more stationary computing device, such as a personal desktop computer, or another device, such as a television, set-top box, electronic picture frame, electronic reading device, etc.

Mobile

Figure 2:
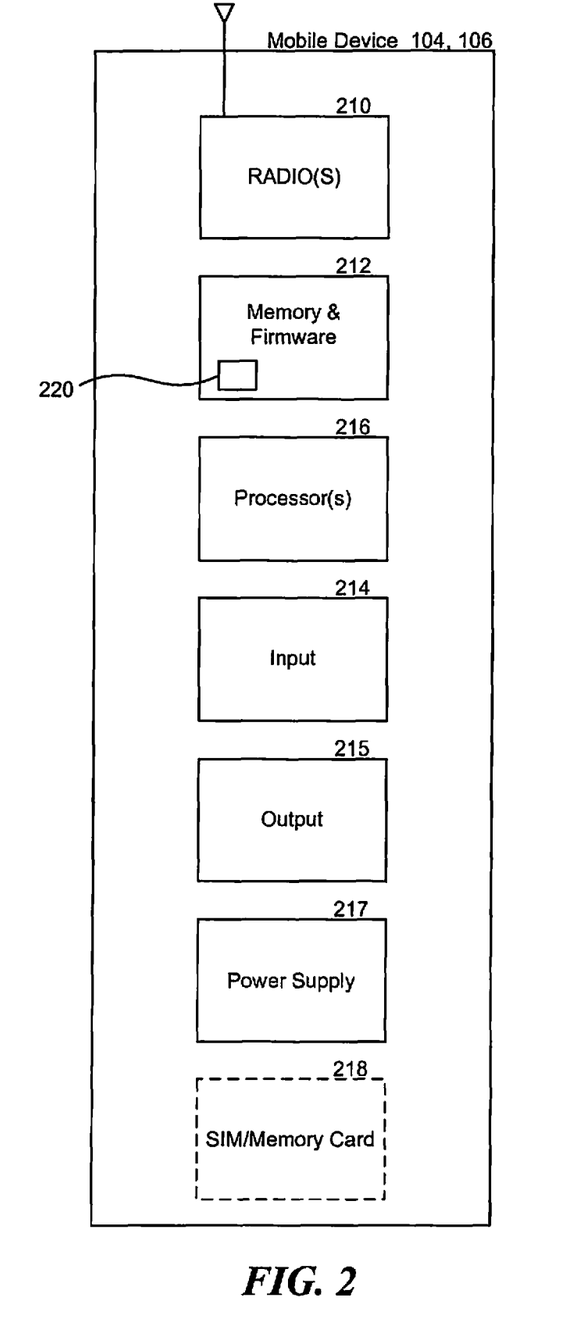
FIG. 2 is a block diagram illustrating a mobile device.

FIG. 2 is a block diagram of the mobile device 104 or 106 according to some implementations. The mobile device 104, 106 includes one or more wireless transceivers or radios 210, a memory and firmware 212, input components 214, and output components 215, which all communicate with one or more processors 216. The input components 214 of the mobile device 104, 106 may include a microphone, user input buttons (physical or via a touch screen), a global positioning system (GPS), a digital camera, a wireless LAN (WiFi) interface, a motion sensor, a Bluetooth® interface, a USB or similar port, and so forth. The output components 215 may include a speaker, headphone or headset jack adapter, visual display, and haptic output device (e.g., a vibrator), as well as the communication elements noted above as input components. For example, the BlueTooth® interface may communicate with an external wireless communications component, such as a wireless headset, to not only receive audio input but also provide audio output.

The communication component can include a radio implementing wireless standards such as LTE, UMTS, Global System for Mobile Communications (GSM), or CDMA 2000, as well as a WLAN, and/or a personal area network (PAN) radio, such as one employing IEEE 802.11, Bluetooth or other wireless standards. The processors in the mobile device 104, 106 can include components for facilitating voice and data calls, processing images, and executing firmware, as well as processors for performing actions described herein. Indeed, as an alternative, or in addition to the processor(s), the mobile device 104, 106 may include one or more digital signal processors (DSPs), application-specific integrated circuits (ASICs), field programmable gate arrays (FPGAs), or other logic/data processing circuitry.

In some instances, the mobile device 104, 106 may include a removable card slot to receive a Subscriber Identity Module (SIM) and/or a removable memory card 218 that may itself include a processor, memory, radio, etc. The removable memory card is received within a card slot of the mobile, and can be of a form and shape common to any known cards, such as SD cards, xD cards, PCMCIA cards, etc. Further, the mobile may include other memory, such as a cache memory for temporarily storing information.

The mobile device 104, 106 includes an operating system (OS), which is resident in the memory 212 and which is executed by the processor 216. One or more application programs may be loaded into the memory 212 and are run by or in conjunction with the OS. Examples of application programs include conventional phone application programs, such as address book/phonebook/contacts programs, as well as game programs, navigation programs, installation wizard programs, customer care applications, email programs, scheduling programs, PIM (personal information management) programs, word processing programs, spreadsheet programs, Internet web browser programs, games, media playback programs, etc. Any application program or the OS can be provisioned according to implementations of the invention.

The memory 212 can include an RRC connection reestablishment module 220. The RRC connection reestablishment module 220 contains data and instructions for reestablishing an RRC connection according to implementations of the present disclosure. For example, the RRC connection reestablishment module 220 includes instructions for reestablishing an RRC connection after the mobile device detects a failure condition according to the routines discussed below with reference to FIGS. 3-6.

The mobile device 104, 106 also includes a power supply 217, which can be implemented as one or more batteries. The power supply 217 may further include an external power source, such as an AC adapter or a powered docking cradle for supplementing or recharging the batteries. Of course, other power supplies may be employed, such as solar cells, transducers for generating electricity for motion, fuel cells, bioelectric or temperature transducers designed to generate electricity and store it in a rechargeable battery/capacitor, and so forth.

While various components, features, and functions of the mobile device 104, 106 have been described in the implementation illustrated in FIG. 2, it should be understood that numerous other configurations, components, features, and the like may be incorporated into the mobile devices described herein, and that the implementations described herein are not limited to any particular configuration for the mobile devices.

Reestablishing an RRC Connection

In an LTE or UMTS network environment, a mobile device establishes an RRC connection with an acceptable cell or a suitable cell for an emergency call. If a failure condition disrupts the RRC connection, the emergency call will be terminated. In order to continue the emergency call after a failure condition, the mobile device can reestablish the RRC connection. However, existing mobile devices operating in an LTE network may not be able to recover the RRC connection for a variety of reasons. The following example scenarios illustrate typical problems.

(1) A mobile device detects a failure condition during an emergency call established through a first acceptable cell. The mobile device cannot reestablish an RRC connection in an LTE or UMTS network environment if it can only find the first acceptable cell or a second acceptable cell to connect to. Instead, the mobile device searches for a suitable cell to connect to.

(2) A mobile device detects a failure condition during an emergency call established through a first acceptable cell. As in the previous scenario, the mobile device can only find the first acceptable cell and/or a second acceptable cell to connect to. The mobile device searches for a suitable cell until a timer (e.g., T311 or T305) expires. The mobile device cannot establish a new emergency call while the timer is running.

(3) A mobile device detects a failure condition during an emergency call established through an acceptable cell. The mobile device searches for and finds a suitable cell to connect to and attempts to reestablish the RRC connection with the suitable cell. If the suitable cell and the acceptable cell that the emergency call was established through belong to different PLMNs, the reestablishment procedure can fail.

(4) A mobile device detects a failure condition during an emergency call. It searches for and finds a suitable cell and reestablishes an RRC connection through that suitable cell. However, if the suitable cell does not support emergency calls, the mobile device may nevertheless remain camped on the suitable cell, unable to end the failed emergency call.

Figure 3:
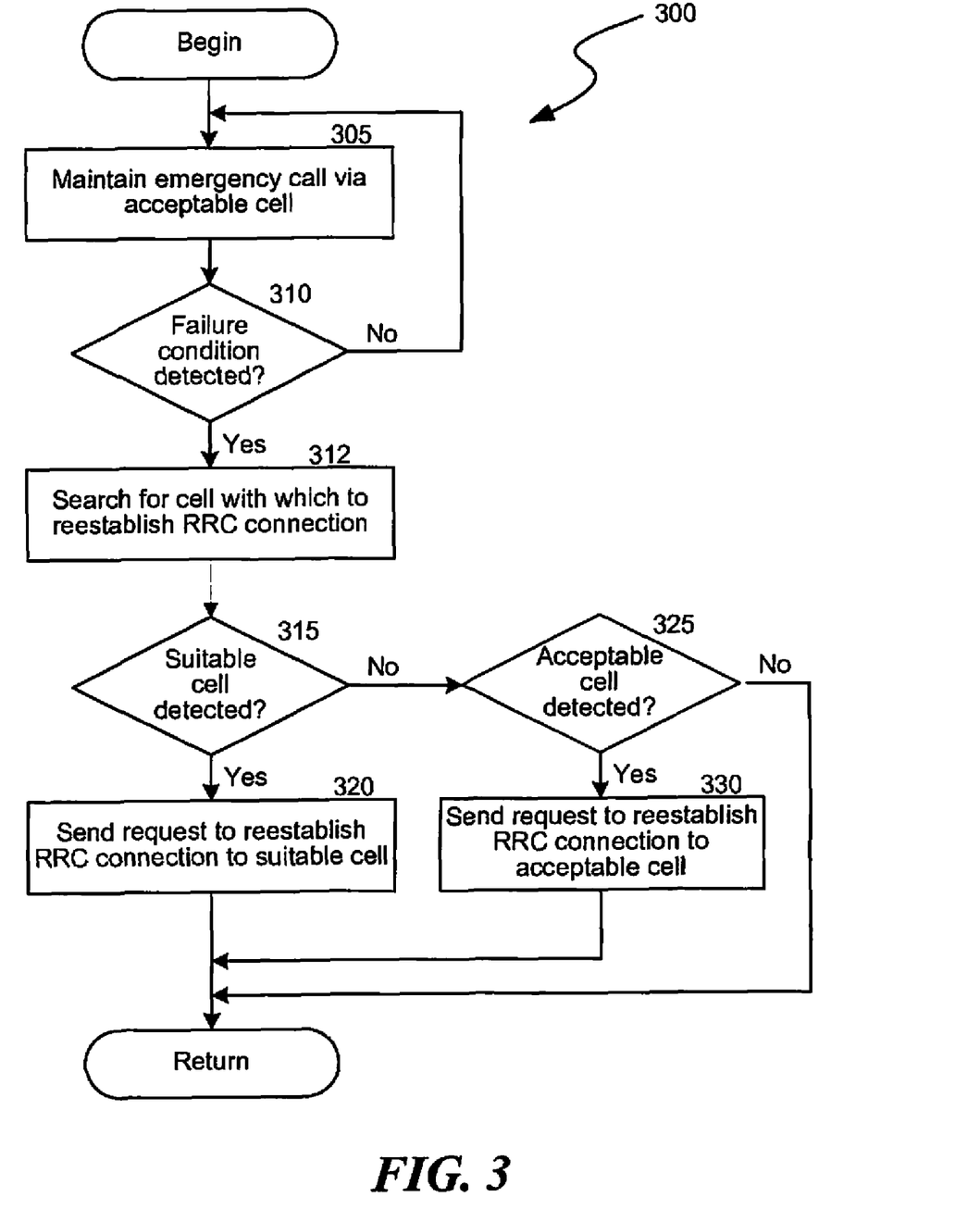
FIG. 3 is a flow diagram depicting an example of a routine to reestablish an RRC connection for an emergency call after a failure condition is detected.

In the first scenario, the mobile device has an RRC connection established with an acceptable cell and experiences a failure event (e.g., a radio link failure, a handover failure, etc.), and finds only the acceptable cell or another acceptable cell available for reestablishing the RRC connection with. FIG. 3 is a flow diagram depicting an example of a routine 300 performed by the mobile device 104, 106 to reestablish an RRC connection under such a scenario.

At a block 305, the mobile device 104, 106 maintains an emergency call via an RRC connection established with an acceptable cell. For example, a user of the mobile device may have prompted the emergency call by dialing 9-1-1, and the mobile device may have searched for available cells that could support the emergency call and found only the acceptable cell, which it established the RRC connection with.

At a decision block 310, the mobile device determines whether it has detected a failure condition that disrupts the RRC connection, and hence, the emergency call. If the mobile device has not detected a failure condition, the process returns to block 305. If the mobile device has detected a failure condition, at a block 312, the mobile device searches for a cell with which to reestablish the RRC connection. For example, the mobile device may search for a cell by detecting and analyzing radio signals broadcast by cells within a certain vicinity of the mobile device.

At a decision block 315, the mobile device determines whether it detected a suitable cell. The mobile device can determine whether a detected cell is a suitable cell or an acceptable cell by analyzing radio signals sent by the detected cell, which identify the cell and/or the services that it offers for the mobile device. If the mobile device did detect a suitable cell, at a block 320, the mobile device sends a request to the suitable cell to reestablish the RRC connection. The mobile device may send an RRCConnection-ReestablishmentRequest message to a detected suitable cell to attempt to reestablish the RRC connection with the suitable cell. After sending the reestablishment request to the suitable cell, the mobile device executes an RRC connection reestablishment procedure with the suitable cell.

If at decision block 315 the mobile device did not detect a suitable cell, at a decision block 325, the mobile device determines whether it detected an acceptable cell. If it does not detect an acceptable cell, the routine 300 ends. If at block 325, the mobile device determines that it did detect an acceptable cell, at a block 330, the mobile device sends a request to a detected acceptable cell to reestablish the RRC connection. As mentioned before, this may be the acceptable cell that the mobile device originally established an RRC connection with. After requesting that the RRC connection be reestablished, the mobile device executes an RRC connection reestablishment procedure or a cell update procedure through the acceptable cell.

In practice, the mobile device treats the acceptable cell as if it were a suitable cell. Existing mobile devices would continue searching for a suitable cell despite an apparent emergency situation and an available acceptable cell. In some implementations, the mobile device does not decide whether a suitable cell is available first before sending an RRC reestablishment request to an acceptable cell. Rather, the mobile device sends an RRC reestablishment request to the acceptable cell if it is detected. In some implementations, the mobile device sends an RRC reestablishment request to an acceptable cell despite also finding a suitable cell. In some implementations, the mobile device receives system information from at least one of the found cells, and the system information indicates that the cell supports emergency calls. Consequently, the mobile device sends the RRC connection reestablishment request to the cell that supports emergency calls. In some implementations, the acceptable cell that the RRC connection was originally established with and the acceptable cell that the RRC connection is reestablished with belong to a same PLMN. In some implementations, the acceptable cells each belong to one PLMN, and in other implementations, at least one of the acceptable cells belongs to multiple PLMNs. When the acceptable cells belong to multiple PLMNs, the mobile device may be configured to only attempt to reestablish the RRC connection with an acceptable cell that belongs to a PLMN that the original acceptable cell belongs to.

Figure 4:
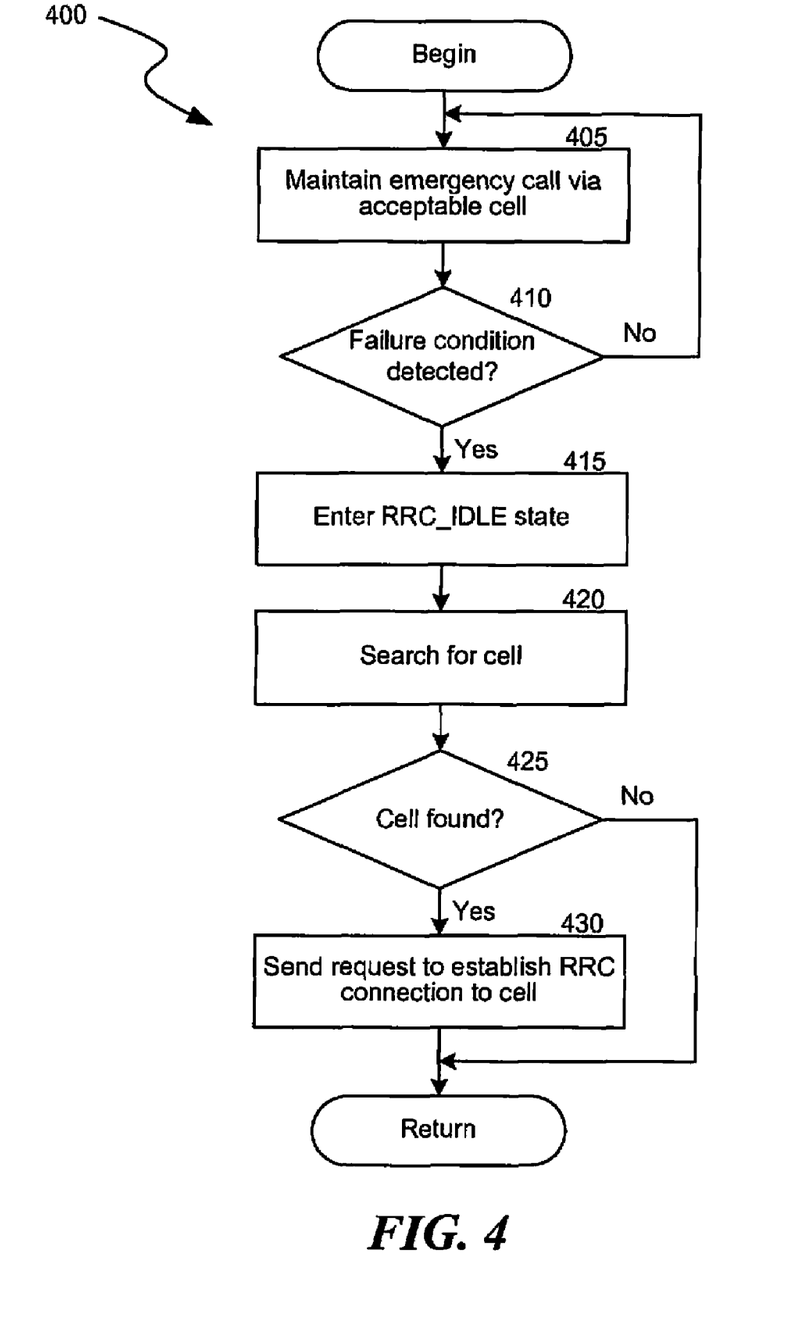
FIG. 4 is a flow diagram depicting an example of a routine to establish an RRC connection for an emergency call after a failure condition is detected.

FIG. 4 is a flow diagram depicting an example of a routine 400 performed by the mobile device 104, 106 to establish a new RRC connection once the mobile device detects a failure condition for an existing RRC connection. At a block 405, the mobile device 104, 106 maintains an emergency call via an RRC connection established with an acceptable cell. At a decision block 410, the mobile device determines whether it has detected a failure condition. If the mobile device has not detected a failure condition, the process returns to block 405. If the mobile device has detected a failure condition, at a block 415, the mobile device enters an RRC_IDLE state. Entering the RRC_IDLE state allows the mobile device to originate a subsequent emergency call without having to wait for a timer (e.g., T311 or T305) to expire. This can be important in an emergency situation, when it is more likely that time is of the essence. After entering the RRC_IDLE state, the mobile device does not initiate an RRC connection reestablishment procedure. At a block 420, the mobile device searches for a cell (acceptable or suitable) to establish a new RRC connection with. At a decision block 425, the mobile device determines whether a cell was found (acceptable or suitable). If no cell was found, the process 400 ends. If a cell was found, at a block 430, the mobile device 104, 106 sends a request to establish an RRC connection with a cell found at block 420. Once the RRC connection is established, the mobile device can originate an emergency call. In some implementations, the mobile device originates an emergency call immediately upon establishing an RRC connection.

Figure 5:
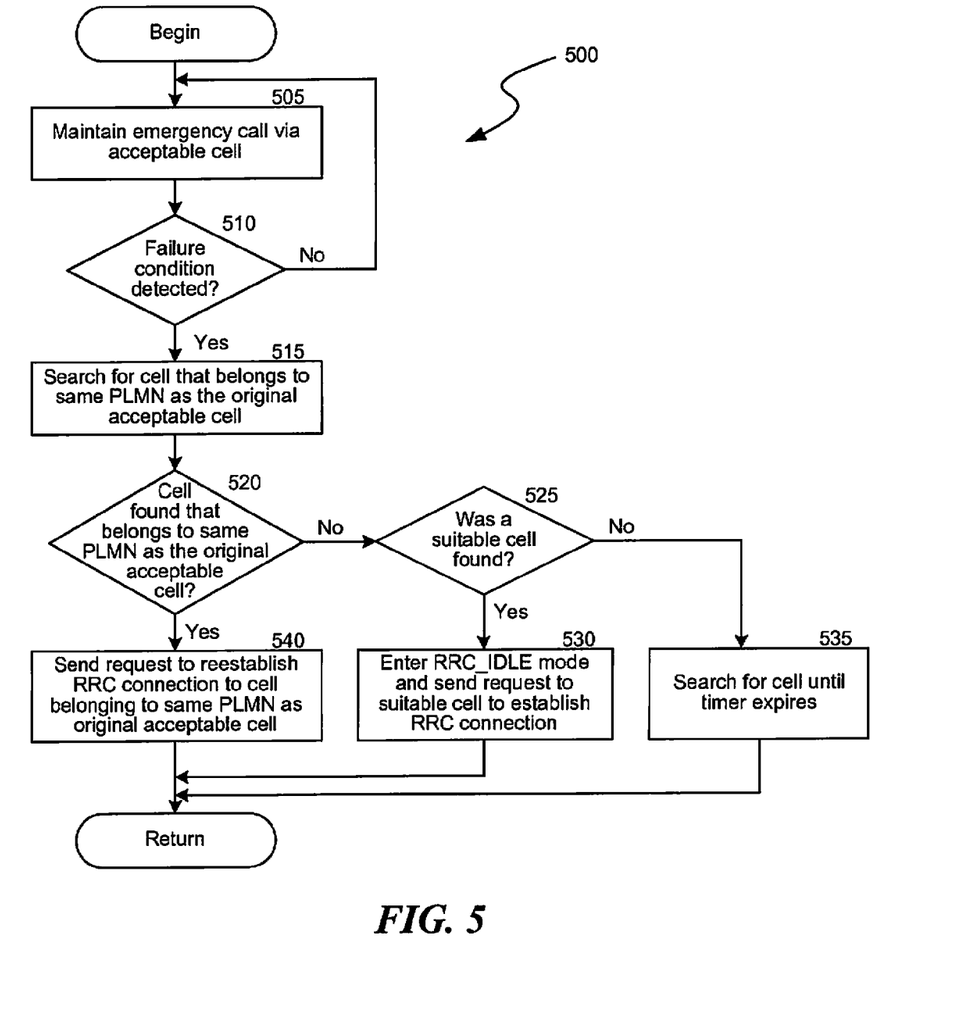
FIG. 5 is a flow diagram depicting an example of a routine to reestablish an RRC connection for an emergency call after a failure condition is detected.

FIG. 5 is a flow diagram depicting an example of a routine 500 performed by the mobile device 104, 106 to reestablish an RRC connection once the mobile device detects a failure condition. At a block 505, the mobile device 104, 106 maintains an emergency call via an RRC connection established with an acceptable cell. At a decision block 510, the mobile device determines whether it has detected a failure condition. If the mobile device has not detected a failure condition, the process returns to block 505. If the mobile device has detected a failure condition, at a block 515, the mobile device searches for a cell that belongs to a PLMN that the acceptable cell that the RRC connection was previously established with belongs to. The mobile device can search for such a cell by analyzing radio signals sent by proximate cells. For example, cells can broadcast which PLMN they belong to, or the mobile device can request this information from detected cells.

At decision block 520, the mobile device determines whether a cell was found that belongs to a PLMN that the original cell also belongs to. If no such cell was found, at a decision block 525, the mobile device determines whether a suitable cell was found that does not belong to a PLMN that the original cell belongs to. If such a cell was found, at a block 530, the mobile device enters an RRC_IDLE mode and subsequently sends a request to the suitable cell to establish an RRC connection with the cell, which is then established with the cell. If no suitable cell was found, at a block 535, the mobile device continues to search for an acceptable cell or a suitable cell that it can establish the RRC connection with until a timer (e.g., timer T311) expires. In some implementations, the mobile device may not reestablish an RRC connection with an acceptable cell that does not belong to a PLMN that the original cell belongs to.

If at a decision block 520, the mobile device determines that a cell was found that belongs to the same PLMN as the original cell, at a block 540, the mobile device sends a request to reestablish the RRC connection to that cell. The cell can be either an acceptable cell or a suitable cell. The request to reestablish the RRC connection can commence, for example, an RRC connection reestablishment procedure or a cell update procedure. In some implementations, the mobile device selects a cell to reestablish the RRC connection with because the cell supports emergency calls. For example, a cell may send signals to the mobile device indicating its ability to support emergency calls, and the mobile device selects the cell at least in part because it supports emergency calls.

Figure 6:
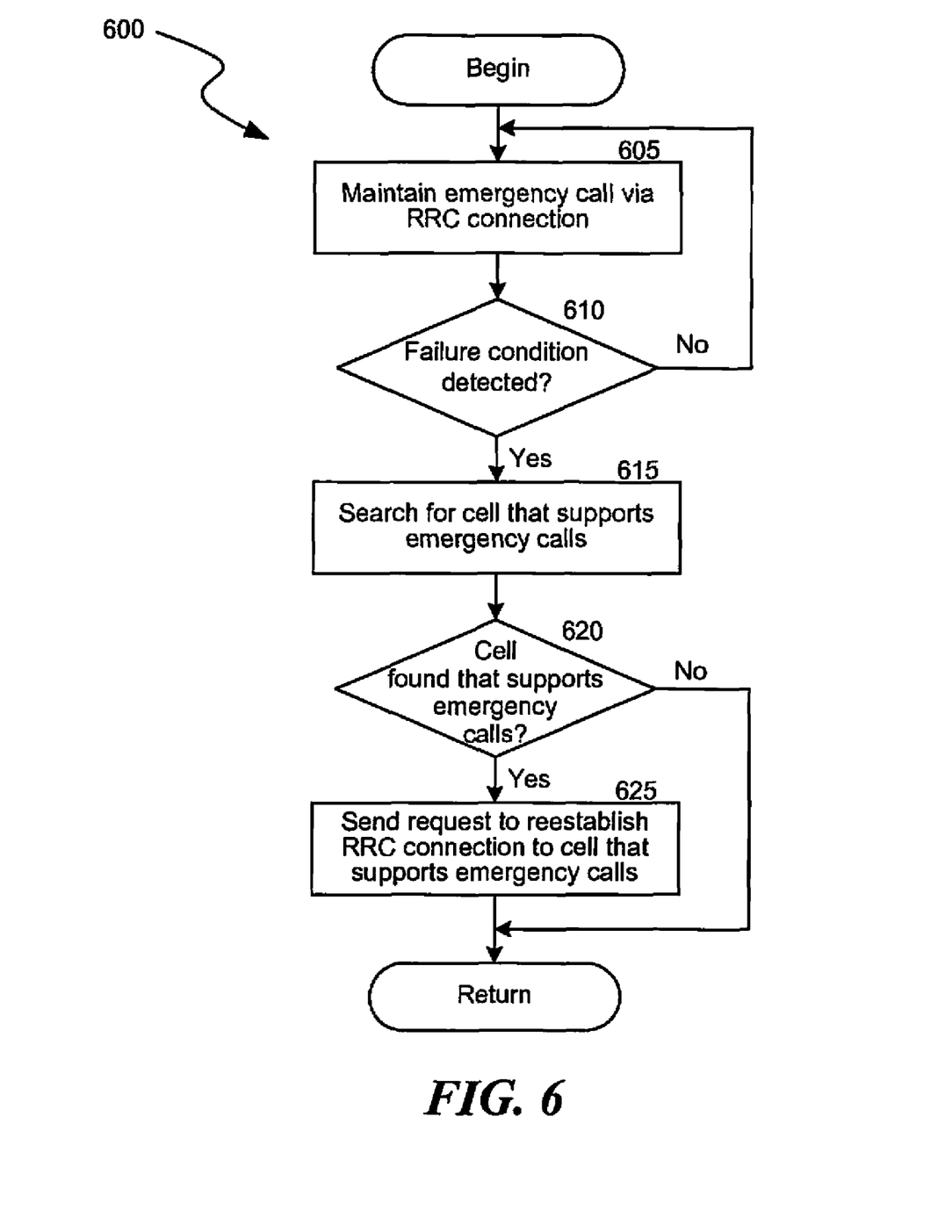
FIG. 6 is a flow diagram depicting an example of a routine to reestablish an RRC connection for an emergency call after a failure condition is detected.

FIG. 6 is a flow diagram depicting an example of a routine 600 performed by the mobile device 104, 106 to reestablish an RRC connection once the mobile device detects a failure condition. At a block 605, the mobile device 104, 106 maintains an emergency call via an RRC connection established with a cell. At a decision block 610, the mobile device determines whether it has detected a failure condition.

If the mobile device has not detected a failure condition, the process returns to block 605. If the mobile device has detected a failure condition, at a block 615 the mobile device searches for a cell that supports emergency calls that it can establish an RRC connection with. For example, the mobile device can search for such cells by analyzing radio signals sent by proximate cells.

At a decision block 620, the mobile device determines whether it has found a cell that supports emergency calls. The mobile device can determine whether a cell supports emergency calls using the signals sent to the mobile device by the proximate cells and/or by examining data related to the cell, such as its system information. If the mobile device does not find a cell that supports emergency calls, the routine 600 ends. If the mobile device does find a cell that supports emergency calls, at a block 625, the mobile device sends a request to reestablish the RRC connection to that cell, initiating an RRC connection reestablishment procedure or a cell update procedure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes, elements, or blocks are presented in a given order or arrangement, alternative implementations may perform routines having steps, or employ systems having blocks or elements, in a different order or arrangement, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in their specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for," but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

I claim:

1. A method of reestablishing a radio resource control (RRC) connection, the method performed by a wireless mobile device configured to communicate wirelessly with a Long Term Evolution (LTE) or a Universal Mobile Telecommunications System (UMTS) network employing a wireless communications protocol, the wireless mobile device comprising a processor, a radio, and a memory, the method comprising:
    establishing an RRC connection with a first acceptable cell of an LTE or UMTS network, wherein the first acceptable cell supports emergency calls;
    establishing an emergency call via the RRC connection;
    detecting a failure condition in the RRC connection, wherein the failure condition is one of a radio link failure, a handover failure, a mobility from Evolved Universal Terrestrial Radio Access (E-UTRA) failure, an integrity check failure, or an RRC connection reconfiguration failure;
    searching for a second acceptable cell that is identified as able to support emergency calls and that belongs to a PLMN that the first acceptable cell also belongs to;
    when a second acceptable cell is detected that is identified as able to support emergency calls and that belongs to a PLMN that the first acceptable cell also belongs to:
        sending a request to the second acceptable cell to reestablish the RRC connection even when a suitable cell is detected, wherein the second acceptable cell is either the first acceptable cell or another acceptable cell, and
    when a second acceptable cell that is identified as able to support emergency calls and that belongs to a PLMN that the first acceptable cell also belongs to is not detected but a suitable cell is detected: entering an RRC_IDLE mode, and
        sending a request to the suitable cell to establish a second RRC connection with the suitable cell.

2. The method of claim 1, wherein the request to the second acceptable cell to reestablish the RRC connection commences an RRC connection reestablishment procedure or a cell update procedure.

3. The method of claim 1, further comprising receiving an indication from the second acceptable cell that it supports emergency calls.

4. A method of establishing an RRC connection, the method performed by a wireless mobile device configured to communicate wirelessly with an LTE or a UMTS network employing a wireless communications protocol, the wireless mobile device comprising a processor, a radio, and a memory, the method comprising:
    establishing a first RRC connection with a first acceptable cell of an LTE or UMTS network, wherein the first acceptable cell supports emergency calls;
    establishing a first emergency call via the first RRC connection;
    detecting a failure condition in the first RRC connection, wherein the failure condition is one of a radio link failure, a handover failure, a mobility from E-UTRA failure, an integrity check failure, or an RRC connection reconfiguration failure;
    directly entering an RRC_IDLE mode upon detecting the failure condition without using a timer or camping on a cell, wherein the timer is associated with a procedure for reestablishing the RRC connection;

establishing a second RRC connection with a second cell; and establishing a second emergency call via the second RRC connection, wherein the second emergency call is established automatically upon establishing the second RRC connection with the second cell.

5. The method of claim 4, wherein the timer is timer T311 or timer T305.

6. A method of reestablishing an RRC connection, the method performed by a wireless mobile device configured to communicate wirelessly with an LTE or UMTS network employing a wireless communications protocol, the wireless mobile device comprising a processor, a radio, and a memory, the method comprising:

establishing a first RRC connection with a first acceptable cell of an LTE or UMTS network, wherein the first acceptable cell supports emergency calls;

establishing an emergency call via the first RRC connection;

detecting a failure condition in the first RRC connection, wherein the failure condition is one of a radio link failure, a handover failure, a mobility from E-UTRA failure, an integrity check failure, or an RRC connection reconfiguration failure;

searching for a second acceptable cell that belongs to a PLMN that the first acceptable cell also belongs to;

when a second acceptable cell that belongs to the PLMN that the first acceptable cell also belongs to is found:

sending a request to reestablish the RRC connection to the second acceptable cell, wherein the second acceptable cell is identified as able to support emergency calls; and when a second acceptable cell that belongs to the PLMN that the first acceptable cell also belongs to is not found but a suitable cell is found:

entering an RRC_IDLE mode; and establishing a second RRC connection with the suitable cell and establishing a second emergency call via the suitable cell.

7. The method of claim 6, wherein the request to reestablish the RRC connection commences an RRC connection reestablishment procedure or a cell update procedure.

8. The method of claim 6, further comprising receiving an indication from the second acceptable cell that it supports emergency calls.

* * * * *